Feb. 3, 1942.   L. BUCHMANN   2,272,033
MOTOR
Filed April 6, 1940   2 Sheets-Sheet 1

INVENTOR
Louis Buchmann,
BY
Beau, Brooks, Buckley & Beau.
ATTORNEYS

Feb. 3, 1942.  L. BUCHMANN  2,272,033
MOTOR
Filed April 6, 1940  2 Sheets-Sheet 2
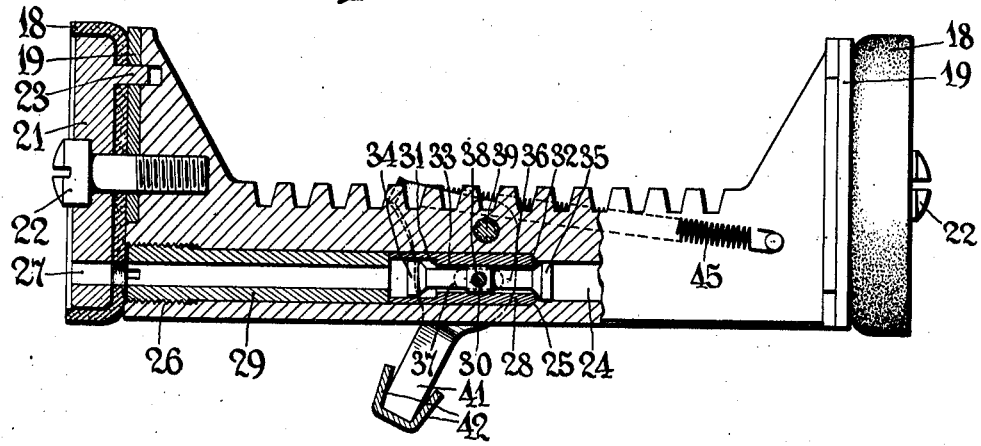
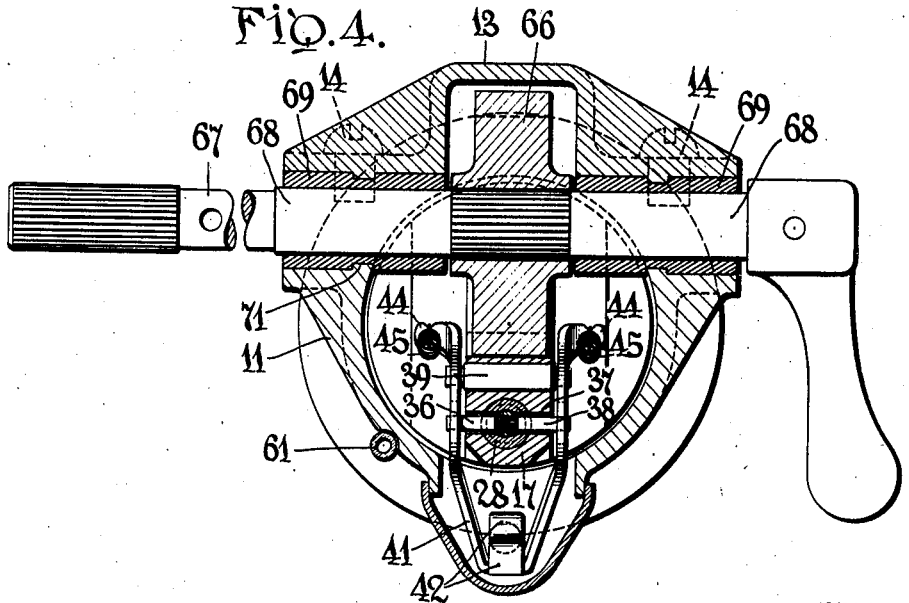
INVENTOR
Louis Buchmann,
BY
Beau, Brooks, Buckley & Beau.
ATTORNEYS Patented Feb. 3, 1942

2,272,033

UNITED STATES PATENT OFFICE 2,272,033

MOTOR

Louis Buchmann, Buffalo, N. Y., assignor to Trico Products Corporation, Buffalo, N. Y.

Application April 6, 1940, Serial No. 328,306

10 Claims. (Cl. 121—123)

The present invention relates to motors operated by differential fluid pressures, and has particular relation to motors of the general type employed for operating windshield wipers and similar devices.

According to the present invention a motor chamber is provided with piston means movable by differential pressures applied to the opposite faces thereof, valve means being provided to admit fluid alternately to opposite sides of the chamber and other valve means serving to permit exhaust of fluid alternately from the opposite sides of the chamber.

One of the valve means, normally held by fluid pressure acting thereon, is shifted by snap action means operable upon engagement of a valve operating trip member with abutment means as the piston means approaches the end of each stroke. The abutment means are adjustable, from the exterior of the casing, whereby the stroke of the piston means many be readily varied. The other valve means operates by the action of fluid pressure thereon, such fluid pressure being determined by the position of the snap action operated valve means.

The invention further contemplates a motor construction wherein the piston means has an operative connection to a shaft which has journal portions on the opposite sides of the connection, and annular bearings around the journal portions and held between sections of the motor casing, whereby the fit of the bearings is not affected by assembly of the parts.

These and other objects and advantages will become apparent from the following description of the typical embodiment of the invention shown in the accompanying drawings, wherein—

Fig. 3 is an enlarged side elevation of the piston means shown in Fig. 2 with portions thereof broken away and shown in vertical section; and, Fig. 4 is a central transverse vertical sectional view of the motor.

Figure 1:
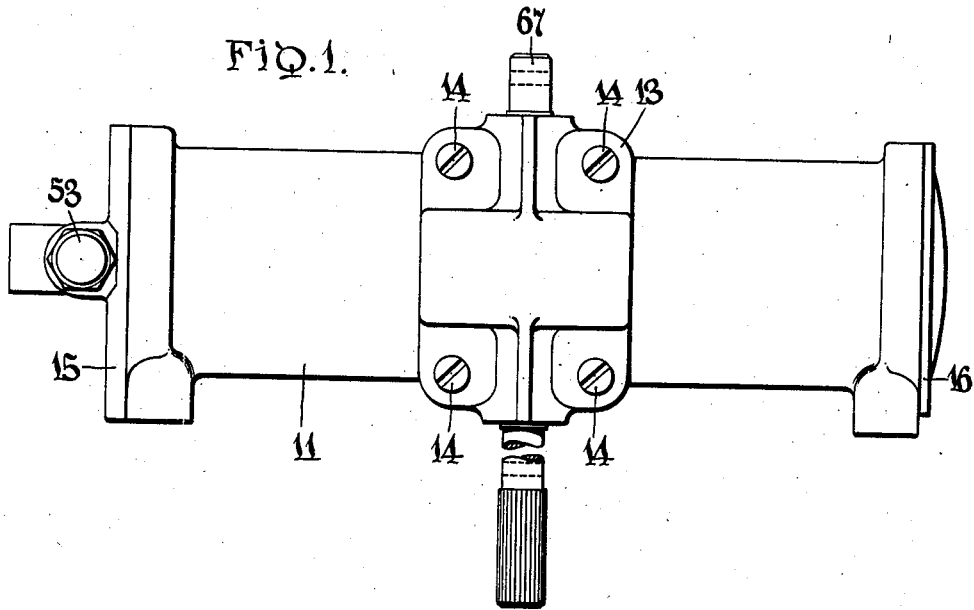
Fig. 1 is a plan view of the motor.

The motor casing comprises a body member 11 provided with a cylindrical motor chamber 12, and a cap member 13 secured to member 12 by fasteners 14. The ends of chamber 12 are closed by cylinder heads 15 and 16, which are secured to the body member by suitable fasteners.

Mounted for reciprocation within the cylinder chamber piston means are provided. The latter include a rack member 17 to the ends of which are secured leather cups 18, the flange portions of the cups bearing upon the cylinder walls and the web portions thereof bearing upon substantially disc shaped supporting plates 19, and members 21, within the leather cups, secured to member 17 by screws 22. A projection 23 on each member 21 extends through aligned openings in the cup leather and plate 19 into a recess in the rack member, preventing turning of the parts about the screws 22.

Extending longitudinally through the rack member is a bore 24 provided with a shoulder 25 and, at one end, screw threads 26. The bore is aligned with an opening 27 extended through each set of members 18 and 21, and in it a valve cage 28 is disposed, being held against shoulder 25 by a nipple 29 which is also in the bore 24 and has screw threads engaged with screw threads 26 of the bore.

The cage 28 has a bore 33 and is provided with valve seats 31 and 32. An outlet valve member associated with the cage has valve heads 34 and 35 for closing against seats 31 and 32, respectively, a stem 36 connecting heads 34 and 35 whereby one of them is in open position when the other is in closed position, and a cross-head 30 slidable in bore 33 of the cage. The cage has elongated slots 37 in the side walls thereof; and a pin 38 that passes transversely through the cross-head 30, extends through these slots.

Pivoted to a pin 39, which extends transversely through the rack member, is an exhaust valve trip lever 41. The latter is substantially U-shaped, having side wall portions disposed on opposite sides of rack member 17 connected by bottom portions from which extend fingers 42. Each side wall portion is provided with an opening 43 through which one end of pin 38 extends, and is also provided with an ear 44 to which is secured one end of a spring 45. The opposite end of each spring is anchored to the rack member 17 in such manner that as the trip lever 41 is moved upon its pivot pin, so that the walls of openings 43 engage pin 38 to shift the exhaust valve, the springs cross the axis of pin 39.

Screw threaded through the casing body member are screws 46, preferably provided with lock nuts 47. One of the screws is adapted to be engaged by a finger 42 of the valve trip lever as the piston unit approaches the limit of its stroke in either direction. A valve cover 48 may also be held in place upon the casing member by the screws 46.

The cylinder head 15 has screw threaded thereinto inlet valve cages 51 and 52, locked in place by caps 53. The cages have valve seats 54 and 55, respectively, adapted to be closed by valves 56 and 57, the latter being so connected that one is open while the other is closed. An opening 58 in head 15 is adapted for connection to a suitable source of fluid under pressure. A passage 59 in cage 51, which communicates with opening 58 when valve 56 is open, is connected to the motor chamber on the right side of the piston means by a conduit 61 and a port 62 in cylinder head 16. A passage 63 in cage 52 places opening 58 in communication with the left end of the cylinder chamber when valve 57 is open.

The teeth 65 of the rack 17 mesh with a pinion 66 mounted on a rock shaft 67. On each side of the pinion, the shaft is provided with a journal 68 received in an annular bearing member 69. Each of these bearing members is received in recesses formed in adjacent portions of the casing body member 11 and cap member 13, and is provided with a circumferential groove 71 receiving complementing ridges on the members 11 and 13 for preventing displacement of the bearings axially of the shaft 67.

Figure 2:
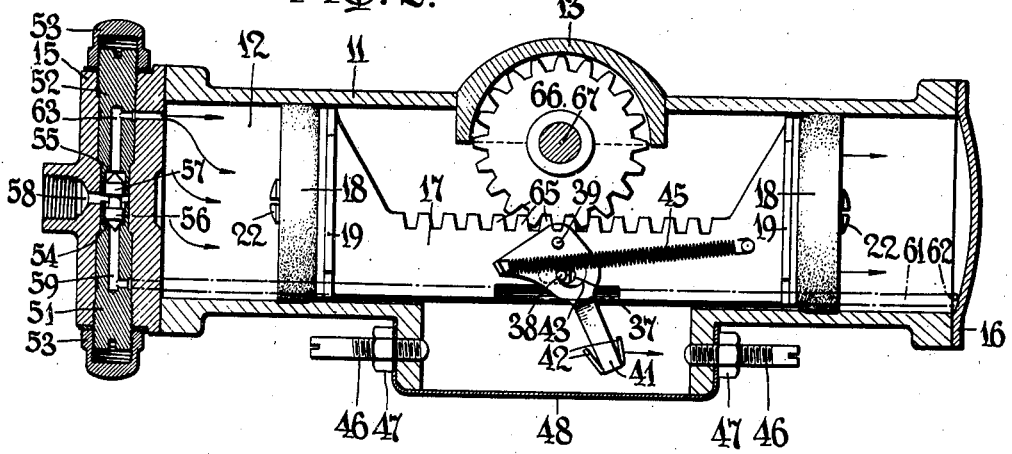
Fig. 2 is a vertical section taken longitudinally therethrough.

In operation, with the parts in the position shown in Fig. 2, fluid entering opening 58 will flow past open valve 57 and through passage 63 into the left side of the motor chamber, moving the piston assembly to the right and the shaft 67 counterclockwise, fluid in the right side of the chamber being expelled via bore 24 in the rack member 17 and open valve 35 and through slots 37 into the portion of the motor chamber between cup members 18, from which it may escape through the small spaces between the members of the casing into the atmosphere.

As the piston assembly approaches cylinder head 16, the trip lever 41 will engage the right screw 46 and will be shifted thereby about pivot 39 until springs 45 pass the axis of the pivot, whereupon the springs will snap the trip lever in a clockwise direction about the pivot, the consequent engagement of the wall of openings 43 with pin 38 causing the exhaust valve unit to be moved to the left to the position shown in Fig. 3, wherein valve 35 is closed and valve 34 is opened.

Immediately the pressure in the left side of the chamber will be relieved, exhausting through the opening in nipple 29 and past the now open valve 34, while further exhaust from the right side of the chamber will be prevented by the closing of valve 35. The pressure of fluid at opening 58 will shift valve unit 56, 57 into the position wherein passage 63 is closed and passage 59 is placed in communication with opening 58, whereupon the operating fluid will enter the right chamber through conduit 61 and port 62 and will move the piston assembly to the left, moving shaft 67 clockwise. Upon the piston assembly reaching a position wherein the trip lever 41 is shifted by abutment with the left screw 46, the parts will again assume the condition shown in Fig. 2, the piston assembly reversing and moving to the right.

By adjusting the screws 46 the stroke of the piston means may be varied as desired, and this adjustment may be carried out entirely from the exterior of the motor without removal of any portion of the motor casing.

It will be understood that during any operating stroke the seated one of valves 56 and 57, and also the seated one of valves 34 and 35, is held seated by fluid pressure, the valve unit 56, 57 being shifted by reversal of pressures acting thereon and the valve unit 34, 35 being shifted by the snap action mechanism including the trip member 41 and springs 45.

It will also be understood that the motor casing members 11 and 13 may be die castings, composed of relatively soft die cast metal, while the stationary parts receiving heavier wear, such as the valve cages 28, 51 and 52 and the bearings 69, may be made of harder material. The bearings 69 may be finished to accurately fit the journal portions of the shaft and may be quickly assembled by placing them upon the shaft and securing the cover section 13 to the body section 11 with the bearings 69 disposed therebetween. Since the bearings are annular in form, their fit with the journals will not be affected by tightening of the cover section 13 in place upon the body section 11.

It will be understood further that the structure specifically shown and described herein is merely illustrative of the inventive principles involved and that these principles may be otherwise embodied without departing from the spirit of the invention or the scope of the appended claims.

I claim:

1. In a motor operable by differential fluid pressures and including a chamber with piston means movable therein, said motor having a fluid inlet port opening into the chamber on each side of the piston means, a fluid outlet port in the piston means leading from each side of the chamber, valve means carried by the piston means for opening one and closing the other of the outlet ports, snap action means operating upon the approach of the piston means to the limit position in either direction to reverse the open and closed condition of said valve means, and pressure responsive valve means movable in accordance with the position of the first mentioned valve means to close one and open the other of said inlet ports.

2. In a motor operable by differential fluid pressures and having a motor chamber divided by a relatively movable wall, fluid inlet valve means for admitting fluid to the chamber on one or the other side of said wall, fluid outlet valve means carried by said wall for exhausting fluid from one or the other side of said wall, one of said valve means being responsive to fluid pressure to shift the same from one to the other of the two operative positions, and snap action means operable upon said wall and chamber approaching limit position for reversing the other of said valve means.

3. In a motor operable by differential fluid pressures and having a motor chamber divided by a relatively movable wall, fluid inlet valve means for admitting fluid to the chamber on one or the other side of said wall, fluid outlet valve means carried by said wall for exhausting fluid from one or the other side of said wall, the inlet valve means being responsive to fluid pressure for shifting from one to the other of the operating positions, and snap action means operable upon said wall approaching limit position relative to the chamber for reversing the fluid outlet valve means.

4. In a motor, a casing having a chamber and piston means movable in the chamber, pressure operable valve means for alternately admitting fluid to the chamber on opposite sides of the piston means, exhaust valve means carried by the piston means comprising a valve portion controlling the exhaust of fluid from each side of the chamber, the valve portions being connected whereby one is open while the other is closed, the closed one of said valve portions being held closed by fluid pressure on the exhaust valve means, and snap action means effective upon approach of the piston means to the end of each stroke thereof for reversing the open and closed position of said exhaust valve means.

5. In a motor, a casing having a chamber and piston means movable in the chamber, pressure operable valve means for alternately admitting fluid to the chamber on opposite sides of the piston means, exhaust valve means comprising a valve portion controlling the exhaust of fluid from each side of the chamber, the valve portions being connected whereby one is open while the other is closed, the closed one of said valve portions being held closed by fluid pressure on the exhaust valve means, and means effective upon approach of the piston to limit position for reversing the exhaust valve means.

6. In a motor having piston means and inlet valve means and exhaust valve means for alternately admitting and exhausting fluid from the motor on opposite sides of the piston for effecting operation of the latter, one of said valve means being operable by the effect of fluid pressure thereon as controlled by the other valve means, and the later comprising a valve portion for each side of the motor, the valve portions being connected whereby one is open while the other is closed, the closed one of said valve portions being held closed by fluid pressure on said other valve means, and means effective upon approach of the piston to limit position for reversing said other valve means, said means comprising a trigger carried by the piston and engageable with stationary abutment means on the motor, said trigger means having a spring operated snap action mechanism associated therewith for snapping the trigger away from the abutment means upon operation of the reversing means.

7. In a windshield cleaner, a casing member having a cylinder chamber therein, a rock shaft extending transversely of said cylinder and having a pinion in the casing, a piston reciprocable in the chamber and including a rack portion engageable with the pinion, valve means operable by fluid pressure influences thereon for alternately admitting fluid to the chamber on opposite sides of the piston, valve means carried by the piston and reversible upon the approach of the piston to the end of each operating stroke for allowing exhaust of fluid from the chamber on one or the other side of said piston, said shaft having a journal portion on each side of said pinion, an annular bearing having for each journal portion a circumferential groove therein, and a cap member for securing the bearings to the casing member, each of said members being recessed to receive said bearings and having ridge portions engaged in the grooves to prevent axial shifting of the bearings.

8. In a windshield cleaner, a casing having a chamber therein and comprising a body member and a cap member, piston means in said chamber and a shaft having an operative connection to said piston means, said shaft having a journal portion on each side of said connection, an annular bearing around each journal portion and held between said body and cap member and disposed in recesses therein, the bearings and at least one of said members having portions cooperating to prevent axial displacement of the bearings.

9. In a motor operable by differential fluid pressures and including a casing having a motor chamber divided by a relatively movable wall, fluid inlet valve means for admitting fluid to the chamber on one or the other side of said wall, fluid outlet valve means for exhausting fluid from one or the other side of said wall, one of said valve means being responsive to fluid pressure to shift the same from one to the other of the two operative positions, the other of said valve means being carried by said wall, and spring operated snap action means carried by said wall and operable upon said wall and chamber approaching limit position for reversing said other of said valve means, said snap action means including a trip member carried by the piston and abutment means therefor adjustably mounted upon the casing.

10. In a motor operable by differential fluid pressures and including a casing having a motor chamber divided by a relatively movable wall, fluid inlet valve means for admitting fluid to the chamber on one or the other side of said wall and responsive to fluid pressure to shift the same from one to the other of the two operative positions, fluid outlet valve means carried by said wall, and spring operated snap action means carried by said wall and operable upon said wall and chamber approaching limit position for reversing said other of said valve means, said snap action means including a trip member carried by the piston and abutment means therefor adjustably mounted upon the casing.

LOUIS BUCHMANN.